(12) United States Patent
Shah et al.

(10) Patent No.: US 9,535,413 B2
(45) Date of Patent: Jan. 3, 2017

(54) AUTOMATIC DEVICE PARAMETER BINDING METHOD AND SYSTEM

(75) Inventors: Harsh Shah, Cleveland, OH (US); David W. Siegler, New Berlin, WI (US); James Edward Joe, Waukesha, WI (US); Qing Jia, Shanghai (CN); Tao Song, Shanghai (CN); Zhen Wei, Shanghai (CN)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 286 days.

(21) Appl. No.: 12/895,486

(22) Filed: Sep. 30, 2010

(65) Prior Publication Data

US 2011/0202145 A1 Aug. 18, 2011

Related U.S. Application Data

(60) Provisional application No. 61/304,227, filed on Feb. 12, 2010, provisional application No. 61/304,261, filed on Feb. 12, 2010, provisional application No. 61/304,275, filed on Feb. 12, 2010.

(51) Int. Cl.
| | |
|---|---|
| *G05B 15/02* | (2006.01) |
| *G05B 19/042* | (2006.01) |
| *G06F 9/44* | (2006.01) |
| *H02J 9/00* | (2006.01) |

(52) U.S. Cl.
CPC ............ *G05B 19/0426* (2013.01); *G06F 8/38* (2013.01); *H02J 9/00* (2013.01); *G05B 2219/21029* (2013.01)

(58) Field of Classification Search
CPC ............... G05B 19/0426; G05B 2219/21029; G06F 8/38; H02J 9/00
USPC ........................................ 700/9, 18, 23, 86
See application file for complete search history.

(56) References Cited

U.S. PATENT DOCUMENTS

| | | | |
|---|---|---|---|
| 4,302,820 A | 11/1981 | Struger et al. | |
| 5,030,939 A | 7/1991 | Lovick | |
| 5,168,441 A | 12/1992 | Onarheim et al. | |
| 5,524,083 A * | 6/1996 | Horne et al. | 700/293 |
| 5,717,588 A * | 2/1998 | Yamane et al. | 700/86 |
| 5,826,060 A * | 10/1998 | Santoline et al. | 703/6 |
| 5,841,654 A * | 11/1998 | Verissimo et al. | 700/83 |
| 5,884,072 A * | 3/1999 | Rasmussen | 709/223 |
| 6,018,335 A | 1/2000 | Onley et al. | |
| 6,047,222 A * | 4/2000 | Burns et al. | 700/79 |
| 6,061,603 A * | 5/2000 | Papadopoulos et al. | 700/83 |
| 6,459,557 B1 * | 10/2002 | Haensgen et al. | 361/93.2 |
| 6,466,827 B1 * | 10/2002 | Stine | 700/18 |
| 6,816,817 B1 * | 11/2004 | Retlich et al. | 702/188 |
| 6,819,960 B1 | 11/2004 | McKelvey et al. | |
| 6,832,118 B1 * | 12/2004 | Heberlein et al. | 700/18 |
| 6,901,316 B1 * | 5/2005 | Jensen et al. | 700/286 |
| 6,978,225 B2 * | 12/2005 | Retlich et al. | 702/182 |
| 6,999,824 B2 * | 2/2006 | Glanzer et al. | 700/18 |

(Continued)

*Primary Examiner* — Charles Kasenge
(74) *Attorney, Agent, or Firm* — Fletcher Yoder P.C.

(57) ABSTRACT

The present invention provides techniques for automatically binding device parameters to an input and output interface. Doing so enables dynamic parameters to be available to the core firmware engine. More specifically, there is no input and output data in the configuration software domain required for mapping the parameters. Rather, the configuration software may directly access the device parameters during the logic execution. This is achieved in a library by representing the parameter repository and the EPATH pointing to each parameter from the configuration software domain.

26 Claims, 6 Drawing Sheets

(56) References Cited

U.S. PATENT DOCUMENTS

| | | |
|---|---|---|
| 7,016,744 B2 * | 3/2006 | Howard et al. ............... 700/83 |
| 7,076,322 B2 * | 7/2006 | Chandhoke ................. 700/181 |
| 7,092,771 B2 * | 8/2006 | Retlich et al. ............... 700/72 |
| 7,130,704 B2 | 10/2006 | McKelvey et al. |
| 7,246,193 B2 * | 7/2007 | Rotvold et al. ............. 710/311 |
| 7,246,194 B2 * | 7/2007 | Train et al. ................. 710/311 |
| 7,272,457 B2 * | 9/2007 | Glanzer et al. ............... 700/83 |
| 7,424,329 B2 | 9/2008 | McKelvey et al. |
| 7,486,999 B2 * | 2/2009 | Glanzer et al. ............... 700/79 |
| 7,561,930 B2 * | 7/2009 | Sokolova ............ G05B 19/056 |
| | | 700/87 |
| 7,822,495 B2 * | 10/2010 | Nixon et al. .................. 700/87 |
| 2003/0160782 A1 | 8/2003 | Kawai et al. |
| 2003/0195639 A1 * | 10/2003 | Nixon et al. .................. 700/19 |
| 2004/0098148 A1 * | 5/2004 | Retlich et al. ............... 700/83 |
| 2004/0153594 A1 * | 8/2004 | Rotvold et al. ............. 710/305 |
| 2004/0221262 A1 | 11/2004 | Hampapuram et al. |
| 2004/0229657 A1 | 11/2004 | Nakanishi |
| 2004/0243654 A1 | 12/2004 | Burr et al. |
| 2004/0260412 A1 * | 12/2004 | Yasui et al. .................. 700/86 |
| 2005/0066104 A1 * | 3/2005 | Train et al. ................. 710/305 |
| 2006/0206218 A1 * | 9/2006 | Glanzer et al. ............... 700/18 |
| 2006/0253205 A1 * | 11/2006 | Gardiner ...................... 700/19 |
| 2007/0130572 A1 * | 6/2007 | Gilbert ............... G05B 19/0426 |
| | | 719/318 |
| 2008/0004727 A1 * | 1/2008 | Glanzer et al. ............... 700/83 |
| 2008/0189526 A1 * | 8/2008 | Sokolova ............ G05B 19/056 |
| | | 712/226 |
| 2008/0228289 A1 | 9/2008 | Hwang et al. |
| 2008/0288618 A1 * | 11/2008 | Vardi et al. ................. 709/223 |
| 2008/0294986 A1 | 11/2008 | Seo et al. |
| 2010/0131081 A1 * | 5/2010 | Brown et al. ................. 700/21 |

* cited by examiner

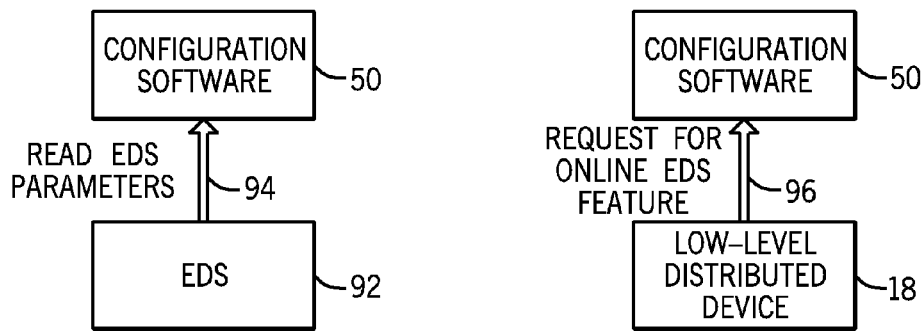
FIG. 8
FIG. 9
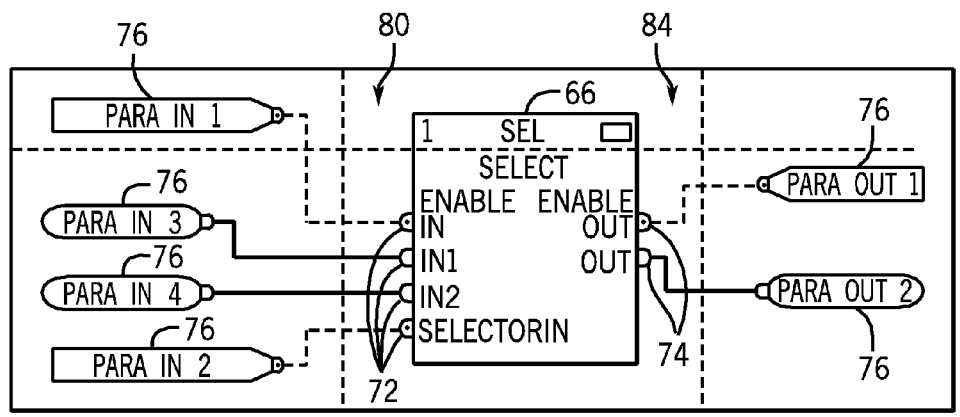
FIG. 10
| PARAMETER NAME | PARAMETER INDEX | EPATH |
|---|---|---|
| PARA IN 1 | 1 | [21][6A][00][24][08][28][00] |
| PARA IN 2 | 2 | [21][6A][00][24][08][28][01] |
| PARA IN 3 | 3 | [21][6A][00][24][08][28][02] |
| PARA IN 4 | 4 | [21][6A][00][24][08][28][03] |
| PARA OUT 1 | 5 | [21][6A][00][24][08][28][04] |
| PARA OUT 2 | 6 | [21][6A][00][24][08][28][05] |
FIG. 11

AUTOMATIC DEVICE PARAMETER BINDING METHOD AND SYSTEM

CROSS REFERENCE TO RELATED APPLICATIONS

This application is a Non-Provisional Patent Application claiming priority to U.S. Provisional Patent Application No. 61/304,227, entitled "Multiple Boolean Inputs and Outputs for Device Function Blocks", filed Feb. 12, 2010, U.S. Provisional Patent Application No. 61/304,261, entitled "Automatic Device Parameter Binding Method", filed Feb. 12, 2010, and U.S. Provisional Patent Application No. 61/304,275, entitled "Macro Function Block for Encapsulating Device-Level Embedded Logic", filed Feb. 12, 2010, all of which are herein incorporated by reference.

BACKGROUND

The present invention relates generally to the field of configuring logic instructions in automation devices, and more specifically to techniques for automatically binding device parameters to an input and output interface.

Logic solving capability may be programmed into various sensor and actuator devices, such as input/output (I/O) devices, motor drives, relays, push buttons, and other automation devices to improve the performance of the devices and to enable limited but rapid response to automation needs without specific direction from a central automation controller. For example, such logic solving capability may control outputs and manage status information of the automation devices to control operation of other components directly or closely connected to the devices. The configuration of the logic solving capability may be accomplished through visual editing tools, which provide graphical interfaces for configuring functions blocks that encompass the local control functions for the devices. Such distributed control allows low-level devices to perform operations heretofore performed only by reference to logic in one or more network-connected automation controllers.

DRAWINGS

These and other features, aspects, and advantages of the present invention will become better understood when the following detailed description is read with reference to the accompanying drawings in which like characters represent like parts throughout the drawings, wherein:

FIG. 8 is a block diagram of the configuration software of FIG. 4 interacting with an electronic data sheet (EDS) file;

FIG. 9 is a block diagram of the configuration software of FIG. 4 interacting directly with the automation device when an EDS file is not used;

FIG. 10 is an exemplary embodiment of a function block with parameters being used with the configuration software and design-time library of FIG. 4;

FIG. 11 is a list of parameters indexes and EPATHs for the parameters of FIG. 10;

BRIEF DESCRIPTION

The present invention provides techniques for automatically binding device parameters to an input and output interface. Doing so enables dynamic parameters to be available to the core firmware engine. More specifically, there is no input and output data in the configuration software domain required for mapping the parameters. Rather, the configuration software may directly access the device parameters during the logic execution. This is achieved in a library by representing the parameter repository and the EPATH pointing to each parameter from the configuration software domain.

DETAILED DESCRIPTION

Figure 1:
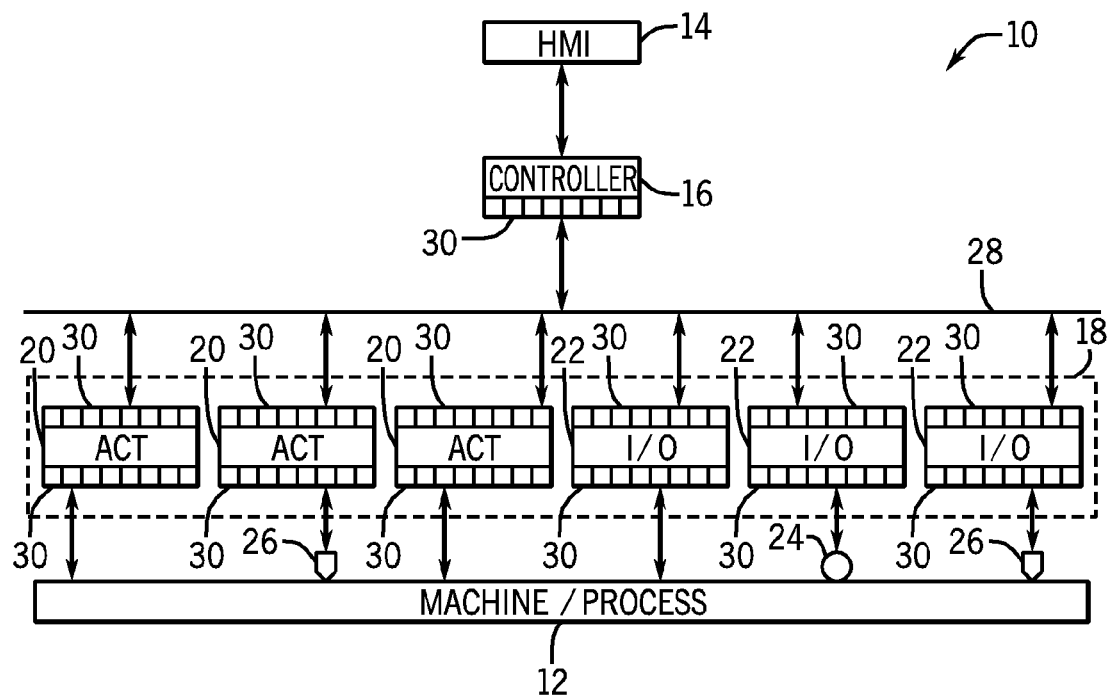
FIG. 1 is a diagrammatical representation of an exemplary control and monitoring system for controlling and monitoring a machine and/or process.

FIG. 1 is a diagrammatical representation of an exemplary control and monitoring system 10, such as for industrial automation, for controlling and monitoring a machine and/or process 12. The system 10 includes a human-machine interface (HMI) 14 adapted to collaborate with components of the machine/process 12 through an automation controller 16 (e.g., a remote computer, programmable logic controller (PLC), or other controller). The automation controller 16 is adapted to control and monitor automation devices 18, such as the actuators 20 and the input/output (I/O) devices 22 (typically sensors or I/O modules coupled to sensors) illustrated in FIG. 1. Specific examples of low-level automation devices 18 as described herein include I/O terminals, motor drives, motor starters, overload relays and other types of relays, push buttons, and so forth. The automation devices 18 may interact directly with the machine/process 12 or may interact with other automation devices 18, such as the sensors 24 and actuators 26 illustrated in FIG. 1. Collaboration between the HMI 14, the automation controller 16, and automation devices 18 of the machine/process 12 may be facilitated by using any suitable network strategies. Indeed, an industry standard network 28 may be employed, such as DeviceNet, ControlNet, Profibus, Modbus, or more common standards such as EtherNet and Internet protocols, to enable data transfer. Such networks 28 permit the exchange of data in accordance with a predefined protocol, and may also provide power for operation of networked elements.

As described in greater detail below, the automation devices 18 may include processors, memory, and low-level embedded logic to enable local (e.g., distributed) control of the automation devices 18 with or without the need to communicate with HMIs 14 or automation controllers 16 (at least prior to making a control decision). The automation devices 18 may include functionality by which they read from or write to specific memory or registers of memory. For example, the automation devices 18 may write to or read from registers 30 of one or more automation controllers 16 or even local registers 30 within the automation devices 18 (including registers within other low-level devices). In a simple case, for example, an automation device 18 may simply access a piece of data (e.g., a state of a component as determined by a sensor), and generate an output signal to write a value to one or more registers 30 corresponding to the state of a different networked device. Much more complex functionality can, of course, be configured. In an industrial control and monitoring context, for example, such automation devices 18 may emulate operation of a range of physical components, such as a momentary contact push button, a push button with delayed output, a switch, and so forth. As described in greater detail below, many pre-programmed device elements (e.g., function blocks) may be available for use by the automation devices 18. Such function blocks may be accessible via a network, or may be resident on the automation devices 18.

Figure 2:
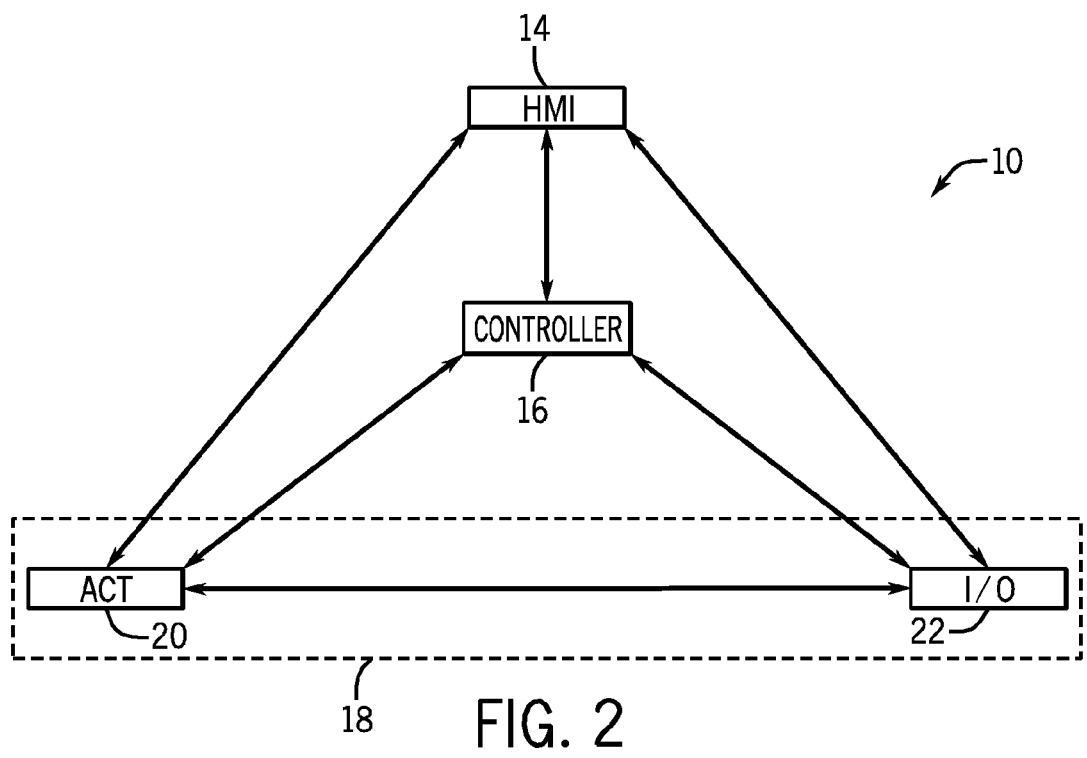
FIG. 2 is a diagrammatical representation of relationships of the exemplary control and monitoring system of FIG. 1.

FIG. 2 is a diagrammatical representation of relationships of the exemplary control and monitoring system 10 of FIG. 1. As illustrated, the HMIs 14, automation controllers 16, actuators 20, and I/O devices 22 form a somewhat triangular hierarchical relationship, with the automation controllers 16 in the center of hierarchy, and the automation devices 18 (e.g., the actuators 20 and the I/O devices 22) at the lower end of the hierarchy. As illustrated, all of the components of the control and monitoring system 10 may communicate with each other, but the low-level automation devices 18 typically receive commands from the automation controllers 16 and/or the HMIs 14. However, the disclosed embodiments enable more robust distributed control of the automation devices 18 by embedding low-level logic directly into the automation devices 18 such that they are capable of making low-level computations and decisions without the need to communicate with the HMIs 14 or the automation controllers 16, at least before the computations and decisions are made, and may output signals generated by the computations and decisions without specific commands from the automation controller 16 or the HMI 14. In other words, the disclosed embodiments enable component level devices, component class devices, architecture level devices, and architecture class devices (e.g., I/O terminals, motor drives, motor starters, overload relays and other types of relays, push buttons, and so forth) to be embedded with low-level automation control logic. This proves advantageous, for example, when the network 28 described in FIG. 1 is experiencing temporary communication problems, or simply when local computations and decisions are desirable.

Figure 3:
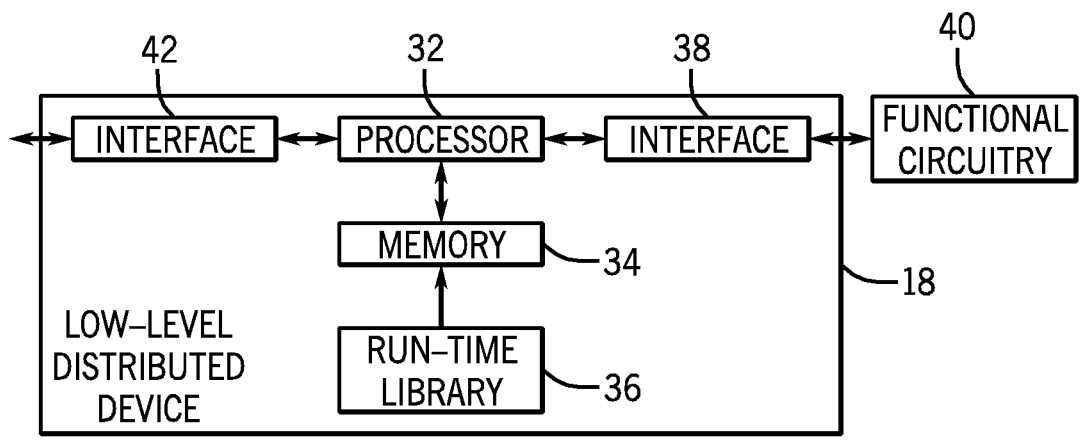
FIG. 3 is a block diagram of components of an exemplary automation device.

FIG. 3 is a block diagram of components of an exemplary automation device 18. As illustrated, each automation device 18 may comprise a configurable tool built around a microprocessor 32. In addition to the processor 32, the illustrated embodiment includes a memory module 34, which may store data and routines (e.g., computer programs) and components such as a run-time library 36 that includes the pre-programmed device elements (e.g., function blocks) described above. The memory module 34 may also include configuration information for the respective automation device 18. For example, as described in greater detail below, each automation device 18 may be configured with a specific combination of function blocks such that the automation device 18 may be capable of performing certain functions locally for the machine/process 12. In particular, the processor 32 is configured to execute the function blocks such that the low-level distributed control functions are performed by the automation device 18.

As described below, a configuration station may be used to write (i.e., download) the specific combination of function blocks to the automation device 18. Conversely, as also described below, the specific combination of function blocks may be read (i.e., uploaded) from the automation device 18 by configuration software of the configuration station. The function blocks are non-transitory code configured in an object oriented programming language. Certain of the function blocks may be configured to read at least one input from and/or write at least one output to one or more of the registers 30 described above. As described below, in a present embodiment, the function blocks themselves comprise objects defined in an object oriented language. Such objects will typically be defined by code that establishes data structures consisting of data fields and methods. The fields may themselves define the properties of the object, while the methods define operations performed by the object during real-time operation of the automation system. The resulting objects form self-sufficient modules that can read from particular memory addresses (e.g., registers 30), write to particular memory addresses, receive inputs (e.g., from sensors), and output signals (e.g., to actuators) based upon their own data structures and methods.

Each automation device 18 also includes a first interface 38 for communicating with functional circuitry 40, such as low-level sensors that provide sensor readings as inputs, low-level actuators that accept outputs generated by the function blocks executed by the processor 32, and so forth. In addition, the automation device 18 also includes a second interface 42 for communicating with a configuration station during configuration of the automation device 18 and/or for communicating with HMIs 14 and/or automation controllers 16 during operation of the automation device 18.

Figure 4:
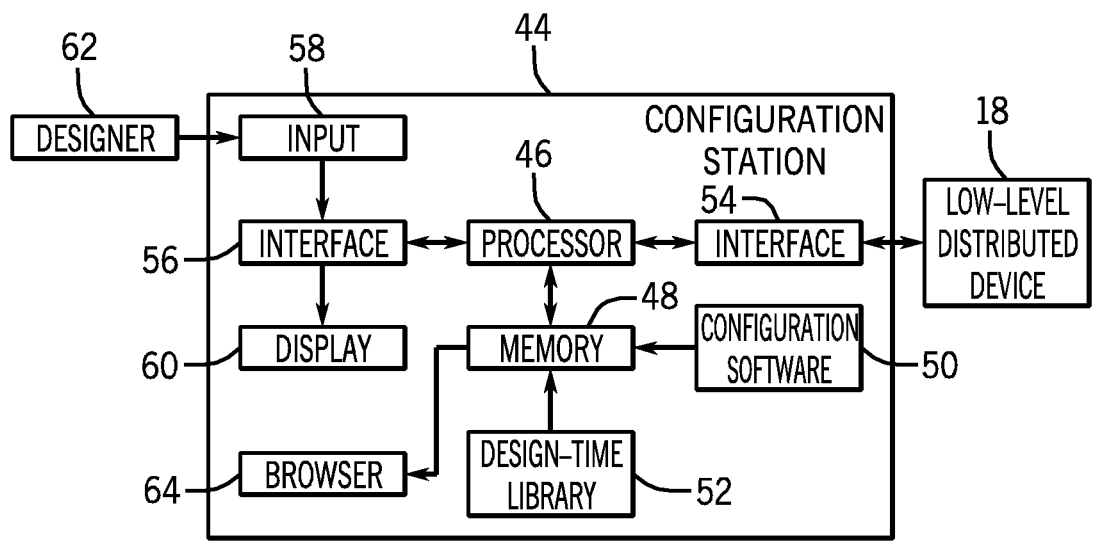
FIG. 4 is a block diagram of components of an exemplary configuration station for configuring the automation devices of FIG. 3.

FIG. 4 is a block diagram of components of an exemplary configuration station 44 for configuring the automation devices 18 of FIG. 3. As illustrated, the configuration station 44 may include configuration software executed by a processor 46. In addition to the processor 46, the illustrated embodiment includes a memory module 48, which may store computer programs and components such as configuration software 50 and a design-time library 52 that includes the pre-programmed device elements (e.g., function blocks) described above. The configuration station 44 is capable of configuring the automation devices 18 with specific combinations of function blocks such that the automation devices 18 may be capable of performing certain functions locally for the machine/process 12. The configuration software may be installed on the configuration station 44 (e.g., as a stand-alone application), or may be accessed by any of a range of remote data exchange schemes (e.g., through a computer browser). Moreover, in some implementations, the configuration or design-time environment may be served to the configuration station 44 by the automation device 18 (e.g., by a server application operative on the automation device 18). In a presently contemplated embodiment, the configuration software 50 may include or be based upon a product available commercially under the designation RSNetWorx, from Rockwell Automation, Inc. of Milwaukee, Wis.

In particular, the configuration station 44 may be used to write, adapt, and load (i.e., download) a specific combination of function blocks to a specific automation device 18. Conversely, a specific combination of function blocks may be read (i.e., uploaded) from automation devices 18 by the configuration software 50 of the configuration station 44. Again, in a presently contemplated embodiment, the function blocks are non-transitory code configured in an object oriented programming language. Certain of the function blocks are configured to read at least one input from and/or write at least one output to one or more of the registers 30 described above.

The configuration station 44 also includes a first interface 54 for communicating with the automation devices 18, such that the configuration station 44 can write a specific combination of function blocks to a specific automation device 18 and read a specific combination of function blocks from a specific automation device 18. In addition, the configuration station 44 also includes a second interface 56 for communicating with an input device 58 and a display 60, which are used to receive inputs from a designer 62 (e.g., a user that configures the automation device 18 with the specific combination of function blocks) and visually display configuration information for the automation device 18, respectively. In particular, in certain embodiments, a browser 64 configured to display a visual representation of the function blocks for a specific automation device 18 may be displayed by the display 62. It should be noted that reference to a "browser" for viewing and modifying configuration of the automation devices 18 is not limited to web browsers or to any particular browser. References to the browser 64 are merely intended to be exemplary. More generally, the term "browser" is utilized herein to reference software which includes any general purpose viewer.

Figure 5:
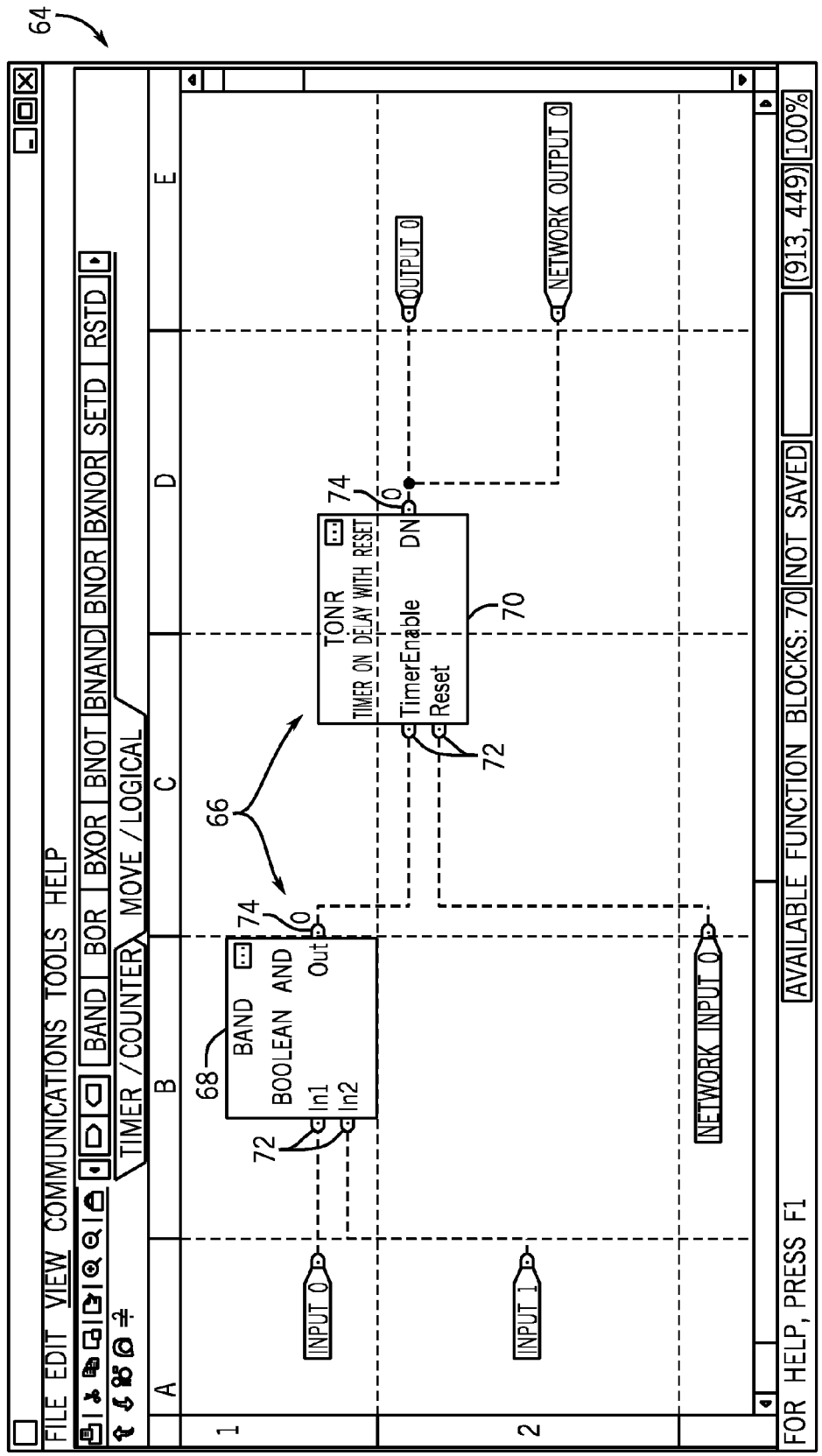
FIG. 5 is a visual representation of an exemplary browser of FIG. 4 for visually displaying the configuration of a particular automation device.

FIG. 5 is a visual representation of an exemplary browser 64 of FIG. 4 for visually displaying the configuration of a particular automation device 18. In particular, the browser 64 displayed in FIG. 5 may be referred to as a function block editor. As illustrated, the particular automation device 18 being configured includes two function blocks 66 (i.e., a Boolean And (BAND) function block 68 and a Timer On Delay with Reset (TONR) function block 70). As illustrated, the BAND function block 68 is configured to receive two inputs 72 and output one output 74. The two inputs 72 into the BAND function block 68 may, for example, be values read from a register 30. In the particular configuration illustrated in FIG. 5, the BAND function block 68 acts upon the two received inputs 72 and outputs the output 74, which is received by the TONR function block 70 as a first input 72 (e.g., TimerEnable). As illustrated, the TONR function block 70 also receives a second input 72 (Reset) from a network-linked source. The TONR function block 70 acts upon the two inputs 72 and outputs a single output 74. As illustrated, the single output 74 from the TONR function block 70 may, for example, be written to a register 30 as well as be sent to a network-linked source. The specific combination of function blocks 66 illustrated in the browser 64 of FIG. 5 are merely exemplary and not intended to be limiting. Although illustrated as only having two function blocks 66, numerous different function blocks 66 may be used for any given automation device 18. Indeed, the design-time library 52 used by the configuration software 50 of FIG. 4 (and, similarly, the run-time library 36 installed in the automation device 18) may include hundreds of different types of function blocks 66 including, for example, Boolean function blocks (e.g., AND, OR, XOR, NAND, NOR, XNOR, and so forth), bistable function blocks (e.g., RS Latch, SR Latch, and so forth), counter/timer function blocks (Up Counter, Up-Down Counter, Pulse Timer, On Delay Timer, Off Delay Timer, and so forth), and various other types of function blocks.

Figure 6:
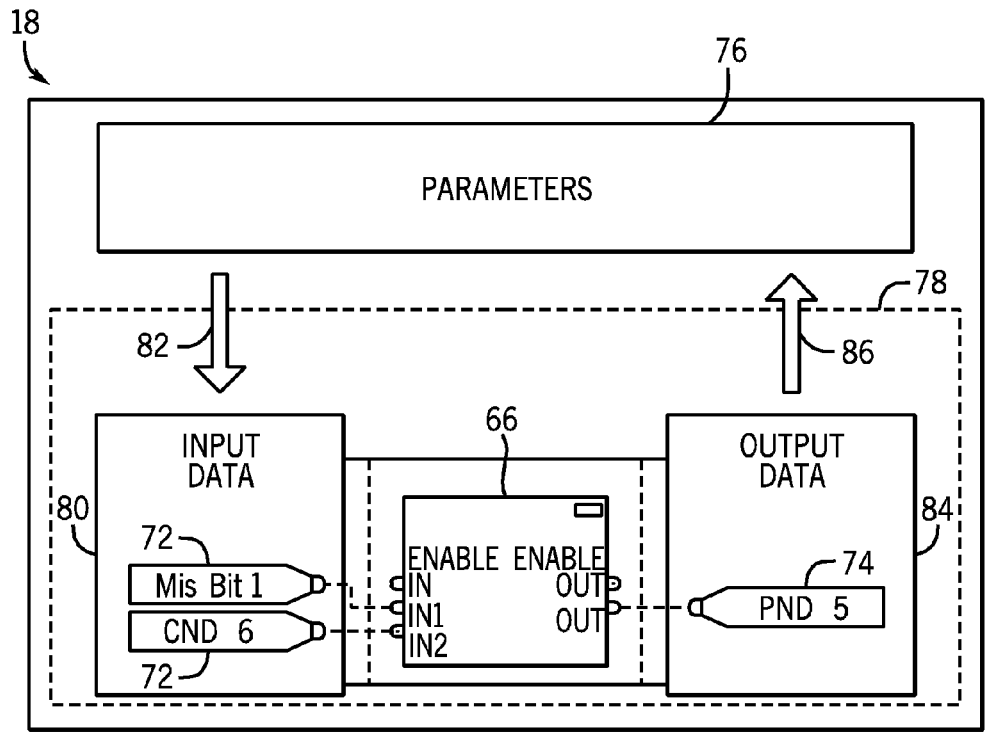
FIG. 6 is a block diagram of an exemplary automation device not having direct access to the device parameters.

FIG. 6 is a block diagram of an exemplary automation device 18. As illustrated, the automation device 18 may include one or more function blocks 66 configured to perform arithmetic and/or logical operations on internal parameters 76 that indicate its current state and give access to its configuration settings. For example, the arithmetic and/or logical operations may include reading the parameters 76 from and/or writing the parameters 76 to a memory circuit external to the particular automation device 18. In some situations, these parameters 76 may be independent of the specific visual editing tools (e.g., the configuration software 50 of FIG. 4) used to configure the automation device 18. In other words, the parameters 76 may exist outside of the domain 78 of the visual editing tools. However, for a specific set of visual editing tools, designers 62 may wish to utilize these inputs and outputs in the programming logic. One solution for designers 62 is to provide data segments for all types of data, for example, Miscellaneous Input Data (MIS), Consumed Network Data (CND), and Produced Network Data (PND). In this type of solution, all of the defined data segments (e.g., MIS, CND, and PND) may have separated memory allocation. Therefore, the input-purpose parameters from outside of the software domain 78 must be copied into the mapping data segments inside the software domain 78 as input data mappings 80, as illustrated by arrow 82. In addition, the output-purpose parameters from inside of the software domain 78 must be copied into the mapping data segments outside of the software domain 78 as output data mappings 84, as illustrated by arrow 86.

As such, for every parameter 76, two copies of its data values exist in the automation device 18, one inside of the software domain 78 and another outside of the software domain 78. For simple automation devices 18 not having many parameters 76, this approach works well because having duplicate memory is not considered to be a problem. However, when more complex automation devices 18 (e.g., motor drives) require a significant number of parameters 76, the situation becomes more problematic. In particular, performance issues may arise. For example, to keep the parameters 76 updated for use, for every logic scan execution, all of the data needs to be exchanged inside and outside of the software domain 78. If there are too many parameters 76, the time consumed during the exchange will add to a delay of the logic execution.

As a compromise approach, the automation device 18 may utilize a scratch pad as a middle point for all eligible parameters 76 as the pointed data in the scratch pad first, and then the program may use the scratch pad data for the logic execution. This approach allows the parameters 76 to be used, while also minimizing the impact of the problems identified above due at least in part to the limited size of the scratch pad. However, this approach may also have certain disadvantages. For example, the designer 62 would need to configure the scratch pad before using the device parameters 76 in the configuration software 50. Thus, this approach is relatively labor intensive. In addition, the browser 64 may only show the name of the data item in the scratch pad. It may not show the real parameter name that is pointed by it. As such, the designer 62 may not recognize which parameter 76 is used.

Figure 7:
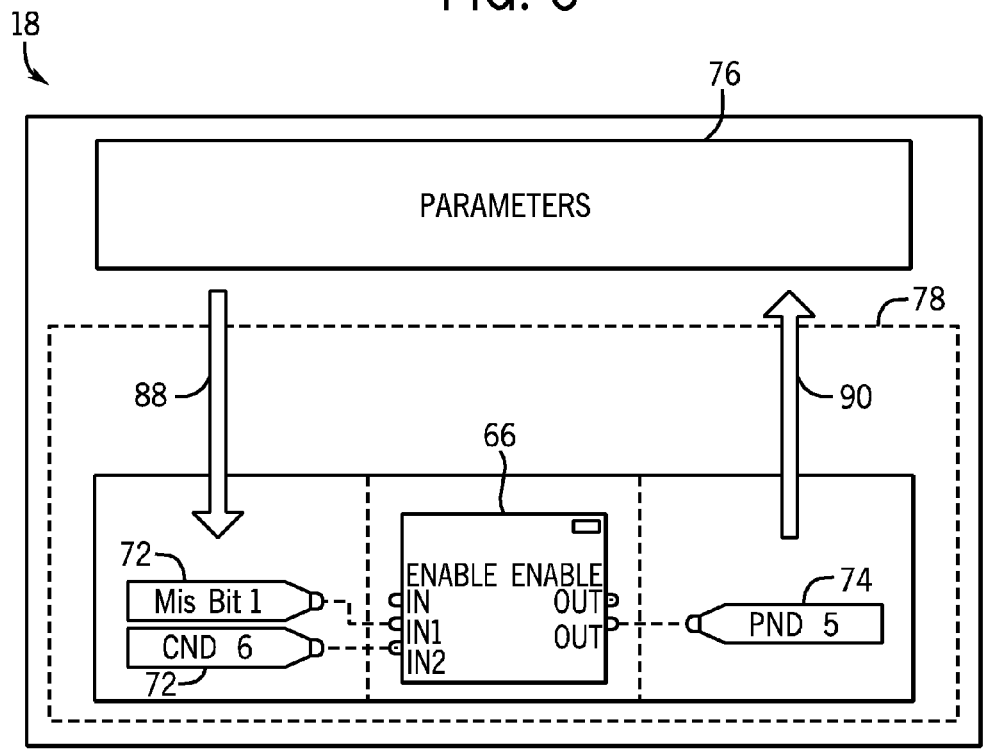
FIG. 7 is a block diagram of an exemplary automation device implementing a run-time engine having direct access to the device parameters.

In order to address these shortcomings, the disclosed embodiments provide a run-time engine where there is no input and output data in the configuration software domain 78 required to map the parameters 76. The configuration software 50 may, instead, have direct access to the device parameters 76 during logic execution. FIG. 7 is a block diagram of an exemplary automation device 18 implementing a run-time engine having direct access to the device parameters 76, as illustrated by arrows 88 and 90.

FIG. 8 is a block diagram of the configuration software 50 of FIG. 4 interacting with an electronic data sheet (EDS) file 92. Electronic data sheet (EDS) files 92 are text files used by network configuration tools to help identify devices and easily commission them on a network, such as the network 28 described above with respect to FIG. 1. As illustrated by arrow 94 in FIG. 8, in the case where an EDS file 92 is used with the automation device 18, the configuration software 50 may read the parameter information directly from the EDS file 92 containing the necessary EDS structures, which will be defined below. However, in the case where an EDS file 92 is not used with the automation device 18, an online EDS feature may be supported by the automation device 18. FIG. 9 is a block diagram of the configuration software 50 of FIG. 4 interacting directly with the automation device 18 when an EDS file 92 is not used. The online EDS feature enables the configuration software 50 to receive equivalent information defined previously in an EDS file 92 directly from the automation device 18, as illustrated by arrow 96. In other words, the EDS information (e.g., including the mapping/binding information for the parameters 76) may be stored in either the EDS files 92 or in the automation device 18 itself. In either case, the structured parameter list in the configuration software 50 may be supported.

It should be noted that, as described above, configurations of the automation devices 18 may both be downloaded to the automation device 18 from the configuration software 50, and uploaded to the configuration software 50 from automation devices 18. In addition, the component function blocks 66 defining the configurations of the automation devices 18 may be altered both within the configuration software 50 and within the automation devices 18. This distributed configuration of the automation devices 18 enables both online and offline distributed control, for example, using EDS files 92 over the network 28 or using EDS information stored in the automation devices 18.

FIG. 10 is an exemplary embodiment of a function block 66 with parameters 76 being used with the configuration software 50 and design-time library 52 of FIG. 4. The input and output data 80, 84 to and from the function block 66 (e.g., a Select function block in the illustrated embodiment) are all directly linked to device parameters 76. "Para In 1" and "Para In 2" are both used as Boolean type input parameters 76, "Para In 3" and "Para In 4" are both used as Analog type input parameters 76. At the output side, "Para Out 1" is a Boolean type output parameter 76, and "Para Out 2" is an Analog type output parameter 76.

The EPATH pointing to these parameters 76 may be defined to facilitate the configuration for the input binding path attributes. It should be noted that all of the parameters 76, whether inputs or outputs, should be assigned a unique index within one device scope. As an example, the parameters 76 in this example are assigned the index and the corresponding EPATH as shown in FIG. 11.

Figure 12:
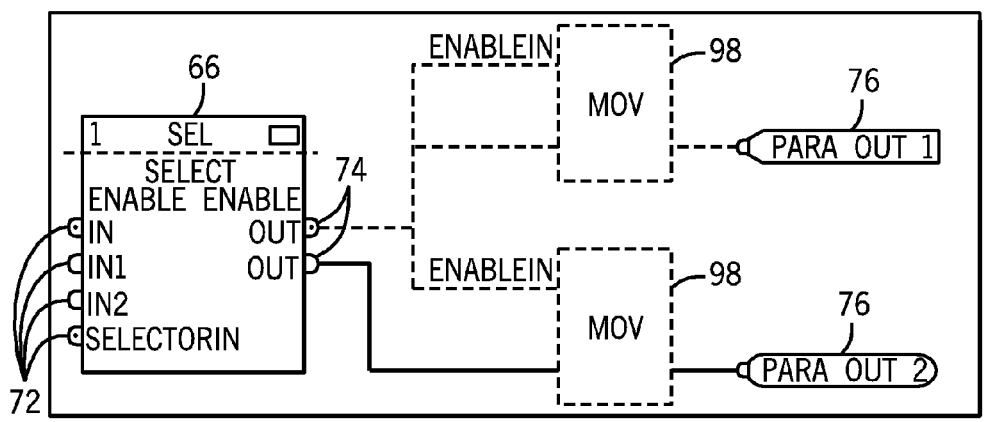
FIG. 12 is a block diagram illustrating real logic executed in the automation device using two background MOV instructions to associate outputs with the output parameters.

The device parameters 76 may be viewed as the device-level predefined tags, which follow with the general operation rules of the tag. Thus, for the output binding of "Para Out 1" and "Para Out 2", a background MOV instruction (e.g., to move a value to a memory location) may be required to take the place of a direct link between the Select function block outputs and these two parameters 76. FIG. 12 is a block diagram illustrating real logic executed in the automation device 18 using two background MOV instructions 98 to associate the outputs 74 of the Select function block with the output parameters 76.

For CIP ("common industry protocol," i.e., an industrial data communications protocol) parameter instances, there is typically one specific section in EDS file 92 (e.g., [Params]) to describe their properties. In this section, each parameter 76 has one mapping entry "ParamN", in which the value of "N" indicates the parameter instance number. It is desirable to have CIP parameters 76 selectable by the configuration software 50. To specify the program-specific information for each parameter 76, a new entry (e.g., 1_CIP_PARAM) may be defined in the section [1_BINDING_PATHS]. 1_CIP_PARAM includes a number of fields. For example, field number 1 may be a required field named Parameter Instance ID, which is the parameter instance ID mapping to the value of "N" in "ParamN" of the Parameter section. Field number 2 may be an optional field named Descriptor, which is the parameter descriptor used to describe its input/output properties in the software domain 78. Field number 3 may be an optional field named Directory String, which includes the parameter directory information. Field number 4 may be a required field named Data Table Path, which is the referenced EPATH pointing to the parameter 76. Field number 5 may be a required field named Data Table Instance ID, which is the referenced data table instance for the parameter 76 to store. Field number 6 may be a required field named Member ID, which is the referenced member ID in the data table corresponding to the parameter 76.

Parameter Instance ID—The configuration software 50 will check the value of this field to find the corresponding "ParamN" in the section [Params]. From there, the configuration software 50 may read the name of this parameter 76, the description, the parameter descriptor, and the data type. CIP elementary data types include: Boolean (Data Type Code: 0xC1), Signed 8-bit Integer (Data Type Code: 0xC2), Signed 16-bit Integer (Data Type Code: 0xC3), Signed 32-bit Integer (Data Type Code: 0xC4), Unsigned 8-bit Integer (Data Type Code: 0xC6), Unsigned 16-bit Integer (Data Type Code: 0xC7), Unsigned 32-bit Integer (Data Type Code: 0xC8), and 32-bit Floating Point (Data Type Code: 0xCA)

Descriptor—This is an optional field to describe the property of Input/Output in the software domain 78. If it is NULL, the corresponding parameter descriptor in "ParamN" will be used as its property. If it is non-NULL, its value will override the descriptor in "ParamN" and be used to indicate the parameter property. The definition of this field follows with the parameter descriptor in "ParamN". Usually, only the bit 4 (Read Only) and bit 14 (Write Only) will be meaningful to editor.

Directory String—This field is defined using the format "N\Directory 1\Directory 2\ . . . . . . . . . . . . \Directory X", where the "\" is used as the separator between the levels of directory, and where the "N" represents the decimal number to indicate the source of directory string. For example, if N is equal to 0, the rest of the string "Directory 1\Directory 2\ . . . . . . . . . . . . \Directory X" contains the directory information. However, if N is non-zero, the directory string comes from the entry GroupN in the EDS section [Groups]. In the GroupN entry, the field of <Group Name String> will be used as the first level directory.

Data Table Path, Data Table Instance ID, Member ID—These fields are used to provide the program-specific addressing reference for the logic processing, editor configuration and monitor, and so forth, which generally has no relation to the EPATH defined in the corresponding "ParamN".

Figure 13:
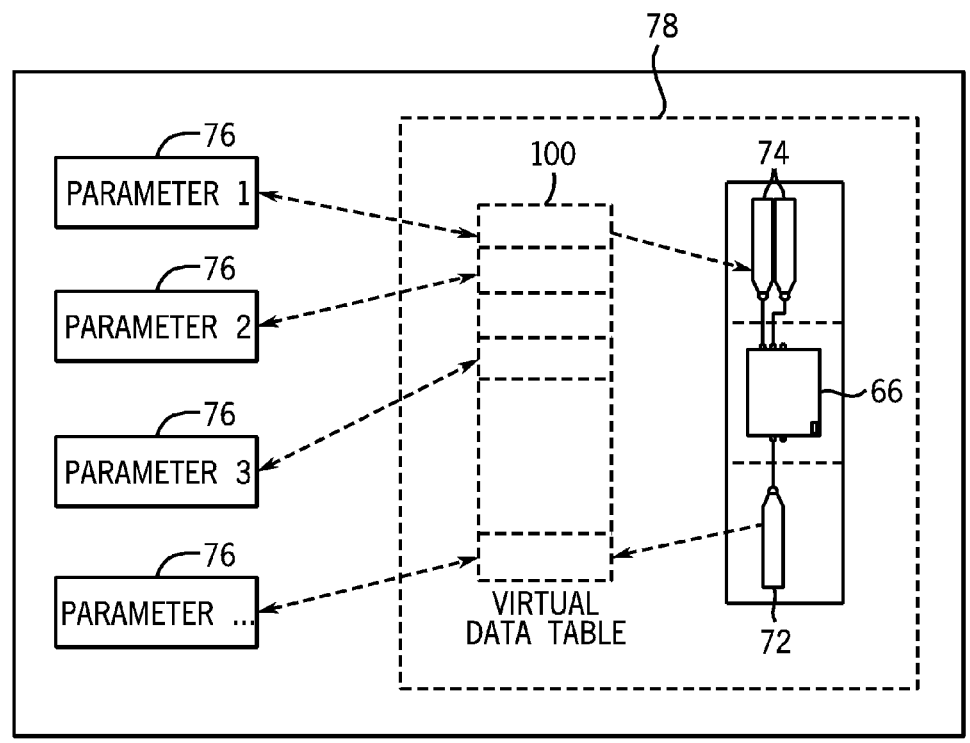
FIG. 13 is a block diagram illustrating an exemplary virtual data table being used by the configuration software to look up the parameters.

In the design-time library 52, to represent the parameter repository and the EPATH pointing to each parameter 76 of the automation device 18, using the example demonstrated above with respect to FIG. 10, one special data table instance may be assigned nominally for these parameters 76. The reason it is a nominal data table instance is because it actually does not contain the value of these parameters 76 in the automation device 18. Instead, it is an addressing mechanism defined to look for the correct parameter 76 of the automation device 18 using this approach. Hence, this data table is essentially a VIRTUAL data table, providing a conversion (e.g., a mapping) from a first parameter designation (e.g., parameter name, parameter ID, register location, and so forth) to a second parameter designation (e.g., parameter name, parameter ID, register location, and so forth) for the same parameter 76. FIG. 13 is a block diagram of an exemplary virtual data table 100 used by the configuration software 50 to look up the parameters 76. As described above, the virtual data table 100 may either be stored in an EDS file 92 or within the memory 34 of the automation device 18 itself.

The parameters 76 in the automation device 18 do not have to be physically assigned in one single memory block, but may be located separately, as illustrated above. In the automation device 18, the virtual data table 100 is used to provide a uniform and continuous addressing space for all the parameters 76 such that the configuration software 50 can uniformly configure and look up the parameters 76 the same way it does other data. As such, the configuration software 50 may be configured to use this virtual data table 100 exactly the same as other "real" data tables. It should be noted that because the parameters 76 may have various data types, this virtual data table 100 will be defined as the TYPE 0 data table. This virtual data table 100 does not store the real parameter values. However, in order to enhance its execution performance, it still needs additional supportive memory entities. The additional memory will be utilized to save the pointer and the data type of the corresponding parameters 76. The design-time library 52 may directly access the value of the parameter 76 via the pointer. As described above, the library implementation maps the parameter index with the corresponding EPATH such that the automation device 18 may easily find and point to the real parameter 76. In general, the format may be Parameter Index=[21][6A][00][24][Data Table Instance ID] [28/29][Parameter Index-1]

Using the disclosed embodiments, the operations related to setting and getting a binding path remain the same as before. With respect to the operations for applying the binding path, the design-time library 52 and the automation device 18 may provide an application implementation interface for the initiation of the supportive parameter pointer list and their data type list. In addition, the design-time library 52 and the automation device 18 may provide an application implementation interface for the validation of the binding path. With respect to reading data values from the source binding path, the parameter data values may be directly read via the pointers in the automation device 18. Similarly, with respect to writing data values to the target binding path, the parameter data values may be directly written via the pointers in the automation device 18. In other words, the design-time library 52 interacts with the EPATH and the virtual data table 100, whereas the automation device 18 directly uses the pointers to the real parameter 76 at the device end.

To avoid potential data access conflicts, when the run-time library 36 of the automation device 18 is executing within its assigned time slot, it may take exclusive privileges to operate on all of the parameters 76 via their pointers. In certain situations, the run-time library 36 of the automation device 18 may need to inquire if the specific parameter 76 has been used before performing specific operations on the parameter 76. In these situations, an inquiry via the parameter index may be performed to check if the parameter 76, whether an input 72 or an output 74, has been used in the run-time library 36 of the automation device 18.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for distributed control of a process, comprising:

accessing a function block configured to perform an arithmetic or logical operation on a parameter having a first parameter designation; and configuring a distributed automation control device that forms part of a machine or process control system, the distributed automation control device storing the function block and executing the function block in operation in the machine or process control system, wherein configuring the distributed automation control device comprises storing in the distributed automation control device a virtual data table comprising a conversion of the first parameter designation to a second parameter designation utilized for the parameter in the machine or process control system, wherein the first parameter designation is in a software domain of a configuration tool used to configure the distributed automation control device, and the second parameter designation is outside of the software domain and independent from the software domain, wherein the virtual data table provides an addressing space that facilitates conversion between a path for the first parameter designation and a pointer for the second parameter designation during use of the distributed automation control device.

2. The method of claim 1, wherein storing the conversion comprises storing in the distributed automation control device a mapping of the first parameter designation with the second parameter designation.

3. The method of claim 2, comprising accessing a mapping of parameters utilized in a machine or process control system, and configuring the distributed automation control device based upon the mapping.

4. The method of claim 3, wherein the mapping is accessed from an electronic data sheet file for the machine or process control system.

5. The method of claim 3, wherein the mapping is accessed from the distributed automation control device.

6. The method of claim 1, wherein the function block is accessed from the distributed automation control device.

7. The method of claim 1, wherein the function block is accessed from a library of function blocks available for use in the distributed automation control device.

8. The method of claim 1, wherein the arithmetic or logical operation comprises reading the parameter from a memory circuit external to the distributed automation control device.

9. The method of claim 1, wherein the arithmetic or logical operation comprises writing the parameter to a memory circuit external to the distributed automation control device.

10. The method of claim 1, wherein the first and second parameter designations correspond to parameter names utilized by different industrial data communications protocols.

11. The method of claim 1, wherein the function block comprises non-transitory code configured in an object oriented programming language.

12. The method of claim 1, wherein the distributed automation control device is an input/output terminal block.

13. The method of claim 1, wherein the distributed automation control device is a push-button block.

14. The method of claim 1, wherein the distributed automation control device is an overload relay.

15. The method of claim 1, wherein the distributed automation control device is a motor drive or a motor starter.

16. The method of claim 1, wherein the path for the first parameter designation is an EPATH of an electronic data sheet (EDS) file.

17. A distributed automation control device, comprising:
a memory circuit storing a function block configured to perform an arithmetic or logical operation on a parameter having a first parameter designation; and
a processor configured to execute the function block in operation in a machine or process control system;
wherein the memory circuit stores a virtual data table comprising a conversion of the first parameter designation to a second parameter designation utilized for the parameter in the machine or process control system, wherein the first parameter designation is in a software domain of a configuration tool used to configure the distributed automation control device, and the second parameter designation is outside of the software domain and independent from the software domain, wherein the virtual data table provides an addressing space that facilitates conversion between a path for the first parameter designation and a pointer for the second parameter designation during use of the distributed automation control device.

18. The distributed automation control device of claim 17, wherein the memory circuit stores a mapping of the first parameter designation with the second parameter designation.

19. The distributed automation control device of claim 17, wherein the distributed automation control device is an input/output terminal block.

20. The distributed automation control device of claim 17, wherein the distributed automation control device is a push-button block.

21. The distributed automation control device of claim 17, wherein the distributed automation control device is an overload relay.

22. The distributed automation control device of claim 17, wherein the distributed automation control device is a motor drive or a motor starter.

23. The distributed automation control device of claim 17, wherein the path for the first parameter designation is an EPATH of an electronic data sheet (EDS) file.

24. A distributed control system, comprising:
a distributed automation control device, comprising a memory circuit storing a function block configured to perform an arithmetic or logical operation on a parameter having a first parameter designation, and a processor configured to execute the function block in operation in a machine or process control system, wherein the memory circuit stores a virtual data table comprising a conversion of the first parameter designation to a second parameter designation utilized for the same parameter in the machine or process control system, wherein the first parameter designation is in a software domain of a configuration tool used to configure the distributed automation control device, and the second parameter designation is outside of the software domain and independent from the software domain, wherein the virtual data table provides an addressing space that facilitates conversion between a path for the first parameter designation and a pointer for the second parameter designation during use of the distributed automation control device; and
an automation controller coupled to the distributed automation control device via a network;
wherein the distributed automation control device is configured to communicate with the automation controller via the network, but executes the function block utilizing the second parameter designation without command from the automation controller.

25. The distributed control system of claim 24, wherein the distributed automation control device is an input/output terminal block, a push-button block, an overload relay, a motor drive, or a motor starter.

26. The distributed control system of claim 24, wherein the path for the first parameter designation is an EPATH of an electronic data sheet (EDS) file.

* * * * *